United States Patent [19]
Dubbeldam et al.

[11] Patent Number: 5,925,433
[45] Date of Patent: *Jul. 20, 1999

[54] OPTICAL RECORDING MEDIUM BASED ON FABRY-PEROT PRINCIPLE

[75] Inventors: Gerrit Cornelis Dubbeldam, Zevenaar; Freddy Gerhard Hendrikus van Wijk, Arnhem; Nico Maaskant, Huissen, all of Netherlands; Kyung Sun Min, Kyungki-do, Rep. of Korea; Young Jae Huh, Seoul, Rep. of Korea; Jong Sung Kim, Sungnam, Rep. of Korea

[73] Assignees: Akzo Nobel N.V., Arnhem, Netherlands; Samsung Electronics Co. Ltd., Suwon City, Rep. of Korea

[*] Notice: This patent is subject to a terminal disclaimer.

[21] Appl. No.: 08/753,547

[22] Filed: Nov. 26, 1996

Related U.S. Application Data

[60] Provisional application No. 60/008,711, Dec. 15, 1995.

[30] Foreign Application Priority Data

| Dec. 1, 1995 | [EP] | European Pat. Off. | 95203301 |
| Dec. 15, 1995 | [EP] | European Pat. Off. | 95203502 |
| Dec. 15, 1995 | [KR] | Rep. of Korea | 95-50705 |

[51] Int. Cl.$^6$ ...................................................... B32B 3/00
[52] U.S. Cl. ...................... 428/64.1; 428/64.2; 428/64.4; 428/64.7; 428/64.8; 428/457; 428/913; 430/270.12; 430/495.1; 430/945; 369/275.4; 369/283; 369/288
[58] Field of Search .................................. 428/64.1, 64.2, 428/64.4, 64.7, 64.8, 457, 913; 430/270.12, 495.1, 945; 369/275.1, 275.4, 283, 288

[56] References Cited

U.S. PATENT DOCUMENTS 4,398,203  8/1983  Cornet ................................. 346/135.1

FOREIGN PATENT DOCUMENTS

| 0 046 104 | 2/1982 | European Pat. Off. | G11B 7/00 |
| 0 130 329 | 1/1985 | European Pat. Off. | G11B 7/24 |
| 0 353 391 | 2/1990 | European Pat. Off. | G11B 7/24 |
| 0 458 604 | 11/1991 | European Pat. Off. | G11B 7/24 |
| WO 96/16402 | 5/1996 | WIPO | G11B 7/24 |

OTHER PUBLICATIONS

*European Search Report* in EP 95/203502 dated May 21, 1996.
Born, et al., "Principles of Optics", *Pergamon Press*, 51–70 (1970).

*Primary Examiner*—Elizabeth Evans
*Attorney, Agent, or Firm*—Dilworth & Barrese

[57] ABSTRACT

The present invention is in the field of optical recording media, and is directed to an optical recording medium which comprises the following layers;
  a) a grooved transparent substrate (1), superposed by
  b) a recording layer comprising a partial mirror (2) of a material having a high complex index of refraction which is not within the pentagon defined by the vertices 7.15 - i3.93, 7.15 - i5.85, 8.96 - 6.28, 9.56 - i5.90, and 8.14 - i3.77 in the n,k plane, superposed by a buffer layer (3) comprising a nonliquid-crystalline high-molecular weight material and optionally a dye, superposed by a thick reflective layer (4), together forming a Fabry-Perot wherein the thickness (d) of the buffer layer within the grooves is set so that the reflection of the medium is in the high reflective state, optionally superposed by
  c) a protective coating (5).

By virtue of the partial mirror, the buffer layer, and the thick reflective layer a Fabry-Perot etalon is created. Information can be written by deformation of one or more of the partial mirror, the buffer layer, the thick reflective layer, or the substrate. The deformation effects change or destroy the Fabry-Perot, and a decrease in reflection is created. As deformation effects are used for writing, a non-liquid crystalline high-molecular weight material can be used in the buffer layer. The tracking (keeping the writing laser within the grooves) can take place by employing the difference in reflected amplitude or phase of the partial mirror/substrate interface within and outside the groove.

11 Claims, 3 Drawing Sheets

OPTICAL RECORDING MEDIUM BASED ON FABRY-PEROT PRINCIPLE

This patent application claims the benefit of US provisional patent application No. 60/008,711 filed Dec. 15, 1995.

The present invention is in the field of optical recording media, such as compact discs (CDs) and digital tapes or cards, more particularly, so-called WORM media (write-once-read-many-times compact discs or tapes) and rewritable CDs and tapes. These types of media allow information to be written by the consumer.

In conventional read-only CDs the information is stored in pits which are embossed in the disc. The reading is based on diffraction on the regular pit-edge structure. Interference of the diffracted orders is dependent on the position of the laser spot. This results in a modulation in reflection, which is used for reading the information. The conventional read-only CDs are only suitable for large-scale production as the production steps (for obtaining a written disc) are rather complicated and therefore only cost effective in mass production. Hence there is need for CDs and digital tapes or cards which can be produced in smaller quantities or can even be written by the consumer himself. In EP 0,353,391 an optical recording medium is described comprising a light transmitting substrate having a deformable surface, a light absorptive layer overlaying the deformable surface, and a light reflective layer overlaying the light absorptive layer, said deformable surface being deformable by energy generated upon absorption of the writing laser beam by the light absorptive layer, to form optically readable pits. The reading is again based on interference of diffracted orders. During irradiation with the reading laser the light travels through the light absorptive layer and is reflected by the reflective layer. As the refractive index within a pit differs from the refractive index outside it (land), the optical pathlength within the pit differs from that of the land. The laser light which falls within the pit interferes with the light which falls on the land causing diffraction. The interference of the diffracted orders depends on the exact position of the reading spot. The resulting reflection modulation is used for reading the information.

There is still need for improvement in reflectivity and contrast in the WORM media and rewritable media proposed so far. In our co-pending PCT patent application WO 96/16402 an optical recording medium is described which comprises a substrate (1) provided with a partially transparent thin reflective layer (2), which is provided with a layer (3) comprising liquid-crystalline material having a thickness (d) between 100 and 1200 nm, which is provided with a thick reflective layer (4) having a reflectance over 50%.

Thus, in comparison with the above-described optical recording media, an extra thin reflective layer is present, resulting in the liquid-crystalline material layer (3) being sandwiched between two reflective layers. In this way a Fabry-Perot etalon is created. The Fabry-Perot phenomenon is used to obtain a difference in reflection between the written and the unwritten state in the digital storage medium. Although a satisfactory contrast can be obtained with the concept described in application WO 96/16402, several problems still have to be solved. First of all, the use of liquid-crystalline material for the recording layer makes the concept rather expensive. As the liquid-crystalline material has to fulfill several requirements (Tg, Tc orientability, etc.), the choice is rather restricted. In consequence of this, the solubility of the liquid-crystalline material of choice in the spin-coating solution often leaves much to be desired. Another disadvantage of the above-mentioned optical recording medium is that the writing principle is based on phase change of the liquid-crystalline material. This has for its consequence that the liquid-crystalline material has to be aligned after application onto the substrate, which results in an additional fabrication step.

With the optical recording medium according to the present invention the above-mentioned problems are reduced or even solved altogether.

The optical recording medium according to the invention comprises the following layers:

a) a grooved transparent substrate (1), superposed by b) a recording layer comprising a partial mirror (2) of a material having a high complex index of refraction which is not within the pentagon defined by the vertices 7.15 - i3.93, 7.15 - i5.85, 8.96 - i6.28, 9.56 - i5.90, and 8.14 - i3.77 in the n,k plane, superposed by a buffer layer (3) comprising a non-liquid-crystalline high-molecular weight material and optionally a dye, superposed by a thick reflective layer (4), together forming a Fabry-Perot wherein the thickness (d) of the buffer layer within the grooves is set so that the reflection of the medium is in the high reflective state, optionally superposed by c) a protective coating (5).

Preferably, the recording layer comprises a partial mirror of a material having a high complex index of refraction which is not within the hexagon defined by the vertices 1 - i0, 2 - i0, 2 - i0.8, 10 - i2, 10 - i8, and 2 - i1.5 in the n,k plane.

By virtue of the partial mirror (2) a Fabry-Perot etalon is created. Information can be written by deformation of one or more of the partial mirror, the buffer layer, the thick reflective layer, or the substrate. The deformation effects change or destroy the Fabry-Perot etalon and a decrease in reflection occurs. As deformation effects are used for writing, a non-liquid-crystalline high-molecular weight material can be used in the buffer layer. The tracking (keeping the writing laser within the grooves) can take place by employing the difference in reflected amplitude and/or phase of the partial mirror/substrate interface within and outside the groove, resulting in diffraction as will be further explained below.

DETAILED DESCRIPTION OF THE PREFERRED EMBODIMENTS

For convenience's sake, the term CD will be used to refer to all optical recording media according to the invention.

A Fabry-Perot etalon typically consists of two parallel reflecting layers placed at some distance (d) from each other.

Figure 1:
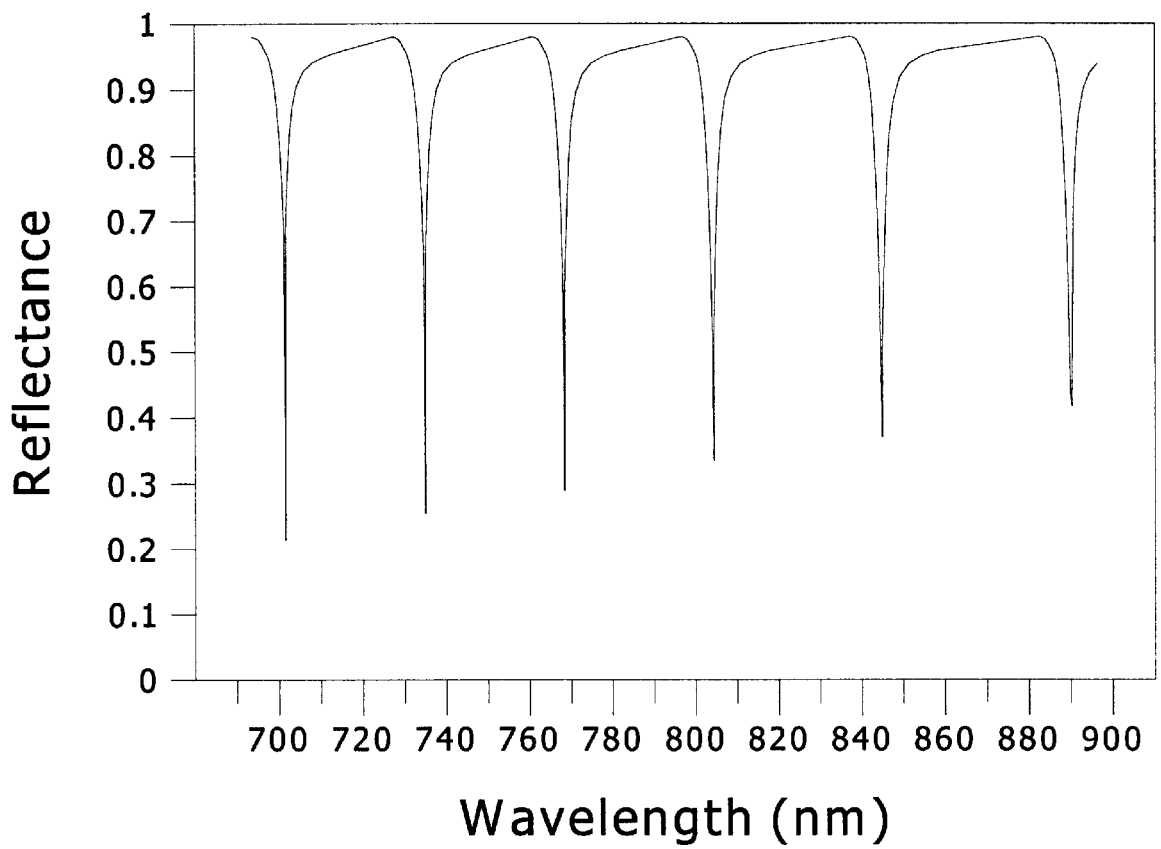
FIG. 1 is a graph illustrating the dependence of the reflectance of a Fabry-Perot etalon on a specific buffer layer thickness, where the Fabry-Perot etalon includes a partial mirror and a thick reflective layer each having a refractive index of 0.08-i4.60 (gold), along with a schematic depiction of a CD.
Figure 1:
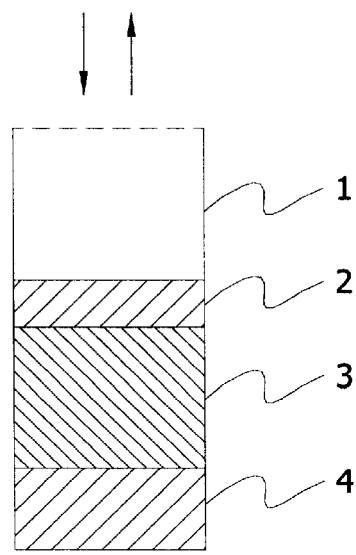

The dependence of the reflectance of a Fabry-Perot etalon on the specific buffer layer thickness is shown in FIG. 1, which provides a schematic depiction of a CD with a substrate (1) having a refractive index of 1.58 and a thickness of 1.2 mm, a partial mirror (2) having a refractive index of 0.08 - i4.60 (gold) and a thickness of 30 nm, a buffer layer (3) having a refractive index of 1.67, and a thick reflective layer (4) having a refractive index of 0.08 - i4.60 (gold) and a thickness of 200 nm. For reasons of clarity, the protective coating (5) is not depicted here.

Figure 2:
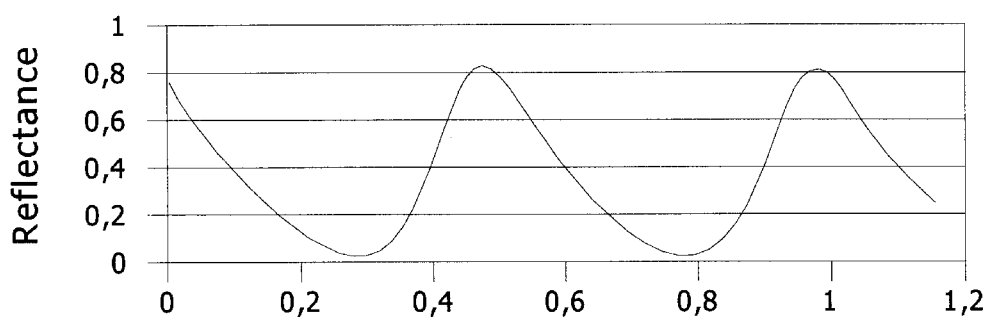
FIG. 2 is a graph illustrating the dependence of the reflectance of a Fabry-Perot etalon on a specific buffer layer thickness, where the Fabry-Perot etalon includes a partial mirror having a refractive index of 2-i4 (aluminum) and a thick reflective layer having a refractive index of 2-i7.5 (aluminum)

The dependence of the reflectance of a Fabry-Perot etalon on the specific buffer layer thickness is shown in FIG. 2, which provides a schematic depiction of a CD with a substrate (1) having a refractive index of 1.57 and a thickness of 1.2 mm, a partial mirror (2) having a refractive index of 2 - i4 (aluminum of a thickness of 11 nm), a buffer layer (3) having a refractive index of 1.50, and a thick reflective layer (4) having a refractive index of 2- i7.5 (aluminum of a thickness of 100 nm). For reasons of clarity, the protective coating (5) is not depicted here. The specific buffer layer thickness is defined as $n \cdot d / \lambda$.

For a gold partial mirror the reflectance is high. The reflectance changes at regular intervals. A minimum reflectance is referred to hereinafter as a reflectance dip. This minimum occurs when there is destructive interaction between the light cycling back and forth between mirrors. This is the case when the requirements of equation 1 are fulfilled. If the requirements of equation 1 are fulfilled, the reflectance is low.

$$\psi + (4\pi \cdot n \cdot d)/\lambda = 2\pi(m + \tfrac{1}{2}) \qquad \text{[equation 1]}$$

wherein $\psi$ stands for the phase shift of the laser light on reflection by the mirrors, n stands for the index of refraction in the unwritten state, d stands for the layer thickness of the buffer layer, $\lambda$ stands for the wavelength of the laser light used for reading, m is an integer from 0–5.

The phase shift $\psi$ depends on the wavelength of the laser light, the mirror thickness, and the indices of refraction of the mirrors and the adjacent media. As in the CD according to the invention information is written within the grooves, the thickness d is the thickness within the grooves.

It is preferred for the recording medium according to the invention to be in the high reflective state of Fabry-Perot with a reflectance above 50% in the unwritten state when the read-out spot of the laser is positioned over the groove and a reflectance above 60% for the read-out spot over the land, because the conventional CD-players need about 20% background reflection from the groove in the written state for tracking, and the CD-standard demands 60% writing contrast. It was found that with partial mirror material fulfilling the complex index of refraction requirements given-above, CDs could be made according to the CD standard. If, however, CD-players become available requiring smaller background reflection, lower reflectance than 50% can be employed. For high-density recording media a reflectance which is above 20% in the unwritten state is preferred. Upon writing the Fabry-Perot is either detuned or destroyed by deformation of one or more of the partial mirror, the buffer layer, the thick reflective layer, or the substrate, resulting in a decrease in reflection by at least 40% of the unwritten state.

As is described below, the position of the reflectance dip is determined by equation 1. The width and the depth of the reflectance dip are influenced by the optical parameters (the index of refraction, the absorption coefficient, and thickness) of the partial mirror (2) and the absorption coefficient of the buffer layer (3). These influences can be determined with the help of a computer program based on a 2×2 matrix formalism for wave propagation in isotropic stratified media developed by Abeles, such as described in M. Born, E. Wolf, *Principles of Optics*, 4$^{th}$ ed., Pergamon Press (1970), p. 51. It can be calculated how in a digital storage medium with a substrate with a refractive index $n_s$ and a thickness $d_s$, a buffer layer with a thickness d and a refractive index $n_u$, and a thick reflective layer having a thickness $d_m$ and a refractive index $n_m$, the thickness of the dielectric layer and/or the absorption of the buffer layer can be adapted to obtain a digital storage medium which fulfils the requirements of a high reflective area of a tuned Fabry-Perot in the unwritten state, These calculations are known to persons skilled in the art and need no further elucidation here.

In the known read-only CDs the recorded information is stored in a spiral track in which regions of low reflectance (written groove area) are alternated with regions where the background reflectance (unwritten groove area) is higher than 65%. For conventional CDs the pit length varies from 0.9 to 3.3 $\mu$m in 0.3 $\mu$m steps. In the longest pits (generating the 11T signal) the reflectance must drop to below 40% of the reflectance in the unwritten state. The read-out laser in a conventional CD-player has a wavelength between 780 and 830 nm, in general 780±10 nm. In order to be compatible with the read-only CD, a CD according to the invention should have a reflectance in the unwritten state of 65% and the reflectance in the longest pit should be below 40% of the reflectance in the unwritten state, when using a conventional read-out laser for CD-players.

The present invention provides CDs having parameters which can be set to make the CD compatible with the conventional read-only CD (hereinafter referred to as the CD standard).

The optical recording medium according to the invention comprises a grooved substrate (1). The medium is read through the substrate. Therefore, the substrate should be optically transparent for the laser light used for reading and writing. In conventional CD-players laser light with a wavelength of 780 nm is used. Polycarbonate, amorphous polyolefin (APO), and glass, which are optically transparent at this wavelength and have sufficient thermal stability and resistance to humidity are suitable substrates. Polycarbonate substrates are preferred for their price and ease of handling. Further, the properties of polycarbonate substrates are within the CD standard. APOs also have properties which lie within the CD standard, but these substrates are more expensive than polycarbonates. However, polycarbonate is susceptible to chemical attack by almost every solvent normally used for applying the buffer layer material. With the CD according to the invention this problem is reduced in two ways: first of all, the partial mirror may protect the substrate from solvent attack. Secondly, as non-liquid-crystalline material is used for the buffer layer, a large freedom of choice of solvent is created. Thus, a relatively mild solvent can be used. Accordingly, in the case of the CD according to the invention polycarbonate can be readily used as a substrate. For high-density CDs the substrate has to be transparent in the wavelength range of 610 to 700 nm, or below.

As mentioned-above, a grooved substrate is used for the CD according to the invention. Said groove is a spiral-shaped track which is pressed in the substrate. This track is used to control the laser spot position during reading and writing. As the partial mirror has a high index of refraction, the tracking can be done via the difference in reflected amplitude or phase of the partial mirror/substrate interface within and outside the groove.

The width and depth of the groove are decisive for the tracking. Usually a track width of 0.1–1.2 μm is used. The track depth is an important parameter which has to be chosen in relation with thicknesses of the buffer layer and partial mirror, and is usually in the range of 30–450 nm. We have found that a relatively deep groove depth of 200–250 nm in combination with a buffer layer thickness of 230–260 nm and an aluminum partial mirror of 6–12 nm, or in combination with a buffer layer thickness of 220 nm and a silicon partial mirror of 50 nm results in an optimal tracking contrast, while preserving the reflection properties. It is also possible to obtain optimal tracking conditions with a track depth of 50–90 nm.

In order to reduce the loss of laser light by reflection at the air/substrate interface, the substrate may be provided with an anti-reflection structure on the side not covered with the thin reflective layer.

For the partial mirror (2) both metal and non-metal materials which fulfils the above-mentioned index of refraction requirements can be employed as long as the layer can be made thin enough to be partially transparent for the laser light. This is usually in the range of 0.3–50 nm, corresponding to about 20–80% transmission. The complex indices of refraction of various materials are listed in *Handbook of Optical Constants of Solids,* parts 1 and 2, ed. Palik, Acc. Press (1985). Thin metal films show a reduced metal like behavior and a person skilled in the art can easily choose a suitable material. With materials having complex indices of refraction falling within the pentagon described-above, it is not possible to find a combination of layer thicknesses and track depths with which an optical medium could be obtained having satisfactory reflection properties and tracking contrast. Preferably, materials are chosen having complex indices of refraction falling outside the hexagon described-above. This will be further elucidated in the Examples.

Metals usually have a high imaginary part of the index of refraction. This means that they are highly reflective when used in transparent environment (such as air and polycarbonate) and absorptive, provided that the product nk is high as well. The absorption α per μm is expressed as $-2\pi nk/\lambda$ ($\lambda$ in μm). Accordingly, upon writing with a laser the laser light is reflected (tracking) by the Fabry-Perot system and absorbed by the metal partial mirror. The absorbed laser light is converted into heat, and deformation of one or more of the partial mirror, the buffer layer, the thick reflective layer, or the substrate occurs. Suitable absorptive metals for the partial mirror (2) are aluminum, nickel, vanadium, chromium, tantalum, iron, nickel-gold, nickel-vanadium, nickel-chromium, aluminum-gold, and other alloys. It is preferred that the metal used has a relatively low heat conductivity, in order to preserve the pit integrity.

Suitable non-absorptive materials are for instance gold, silver, tellurium, copper, or alloys thereof, or silicon, silicon nitride, silicon-germanium, silica, SiO, SiO-germanium, etc. This type of material usually has one high part of the index of refraction (the real or imaginary part). This means that the material is reflective, but hardly absorptive. Upon writing with a laser on CDs with this type of partial mirror, the laser light is reflected by the Fabry-Perot system, but the absorption of the laser light will mainly have to take place in the buffer layer. Thus, when employing a non-metal partial mirror in the CD according to the invention, it is preferred to use a highly absorptive buffer layer. Especially preferred are germanium, silicon-germanium alloys, silicon nitride, and silicon because of their low imaginary parts of indices of refraction, and gold, copper, tellurium, and alloys thereof because of their low real parts of indices of refraction. The partial mirror may be applied onto the substrate in any conventional method normally used in the field such as vacuum deposition, electron beam deposition and sputtering.

The non-liquid-crystalline high-molecular weight (500–250,000) material being any material which has a suitable Tg, serves as a stable matrix for the dye, and can be applied with satisfactory accuracy in thickness. The thickness of the buffer layer as present within the groove may vary from 0.2 μm to 1 μm. The Tg of the material preferably is above 70° C. Examples of suitable non-liquid-crystalline high-molecular weight material are polymers such as PMMA, styrene acrylonitrile, or glasses such as glasses of sulfonyl dianiline and epoxides of cyanobiphenyl and o-biphenyl and glasses of sulfonyl dianiline and p-biphenyl. The dyes present in the buffer layer serve to convert the writing laser light into heat, whereupon one or more of the partial mirror, the buffer layer, the thick reflective layer, or the substrate is deformed. If a metal partial mirror is used the dye concentration may be decreased or the dye may even be omitted, because the laser light is also absorbed by the metal partial mirror and the reflective layer (4). Suitable dyes must therefore absorb in the wavelength range of the writing laser used. For CDs according to the CD standard, which are written with a 780 nm laser, near-infrared absorbing dyes, absorbing in the wavelength range of 780 to 850 nm, are used. Examples are anthraquinone dyes: IR-750®, ex Nippon Kayaku Co. Ltd, squarilium dyes: NK-2772®, ex Nippon Kankoh-Shikiso Kenkyusho Co. Ltd, bis-[3-(7-isopropyl-1-methyl)-azulene-4-yl-2-ethyl-propionic acid n-butyl ester] squaric acid dye (EP 0,310,080, example 16), dyes described in EP 0,310,080, and croconium dyes: ST 172®, ex Syntec, ST 9/3®, ex Syntec, ST 9/1®, ex Syntec, phthalocyanine dyes: copper(II)-1,4,8,11,15,1 8,22,25-octabutoxy-29H,31H-phthalocyanine, zinc-1,4,8,11,15, 18,22,25-octabutoxy-29H,31H-phthalocyanine, ex Aldrich.

For high-density CDs, dyes are required which absorb in the wavelength range of 400 to 700 nm. Examples of these dyes are: azo dyes: Sl-361®, ex Mitsui Toatsu Chemicals GmbH, anthraquinone dyes: LCD 116® and LCD 118®, ex Nippon Kayaku Co. Ltd, M-137®, M-483®, M-83®, and Sl-497®, ex Mitsui Toatsu Chemicals GmbH, squarilium dyes: ST 6/2® and ST 5/3®, ex Syntec, triphenylmethane dyes: Fast Green FCF® and Solvent Blues, ex Aldrich.

The buffer layer may contain up to 90% by weight dye. However, it is preferred to employ an amount up to 30% by weight to avoid segregation problems. The buffer layer may also comprise stabilisers and/or $^1O_2$-quenchers to improve the stability of the layer. For applying the buffer layer, the high-molecular weight material and optionally the dye and other additives are, preferably, solved in a suitable solvent and spin-coated. Other conventional means of applying coatings with accurate thicknesses may also be employed.

As mentioned above, the absorption coefficient of the buffer layer in combination with the optical parameters of the partial mirror influences the reflection and absorption of the Fabry-Perot. The absorption coefficient is determined by the dye concentration and its extinction coefficient in the buffer layer. This can be used to determine the parameters for CDs according to the invention which comply with the CD standard.

The thick reflective layer is preferably a metal layer such as gold, aluminum, silver, copper, chromium, nickel, platinum, alloys such as aluminum-titane, copper-aluminum, etcetera, superposed onto the buffer layer by, for instance, chemical vapour deposition or sputtering. This thick layer should not be transparent to the laser light. As aluminum is cheaper than gold, and the reflectivity of an aluminum layer with a thickness above 50 nm is sufficiently high, the use of aluminum or alloys thereof for the thick reflective layer is preferred. For conventional CDs a light transmission of 0–5% is preferred. For high-density CDs a transmission below 55% is preferred.

The protective coating (5) can be any resin having a high impact resistance. Usually a UV curable resin is used, which is applied by spin-coating, followed by UV irradiation for curing. Other suitable materials for the protective coating are epoxy resins, acrylate resins, silicone hard coat resins, and urethane resins. The thickness of the protective coating is not critical and is usually within the range of 3 to 30 μm, preferably 5 to 15 μm.

The invention is further directed to a method for the fabrication of an optical recording medium according to the invention. Said method comprises the steps of:

applying a partial mirror onto a grooved substrate, applying a buffer layer onto said partial mirror, applying a thick reflective layer onto said buffer layer.

As mentioned-above, the partial mirror and thick reflective layer can be applied by, for instance, vacuum deposition, electron beam deposition, or sputtering. The buffer layer may be applied by, for instance, spin-coating, This method of fabrication can easily be made into a continuous process. An apparatus for fabrication of conventional read-only CDs can easily be adapted for the fabrication of the optical recording medium according to the invention by inserting means for applying the partial mirror, and means for applying the buffer layer into the conventional line. The invention is also directed to an apparatus for the continuous fabrication of an optical recording medium according to the invention, comprising:

means for transporting a grooved substrate, means for applying a partial mirror onto said substrate, means for applying a buffer layer onto said partial mirror, means for applying a thick reflective layer onto said buffer layer.

The invention will be further elucidated with reference to the following unlimitative examples.

EXAMPLE 1

Figure 3:
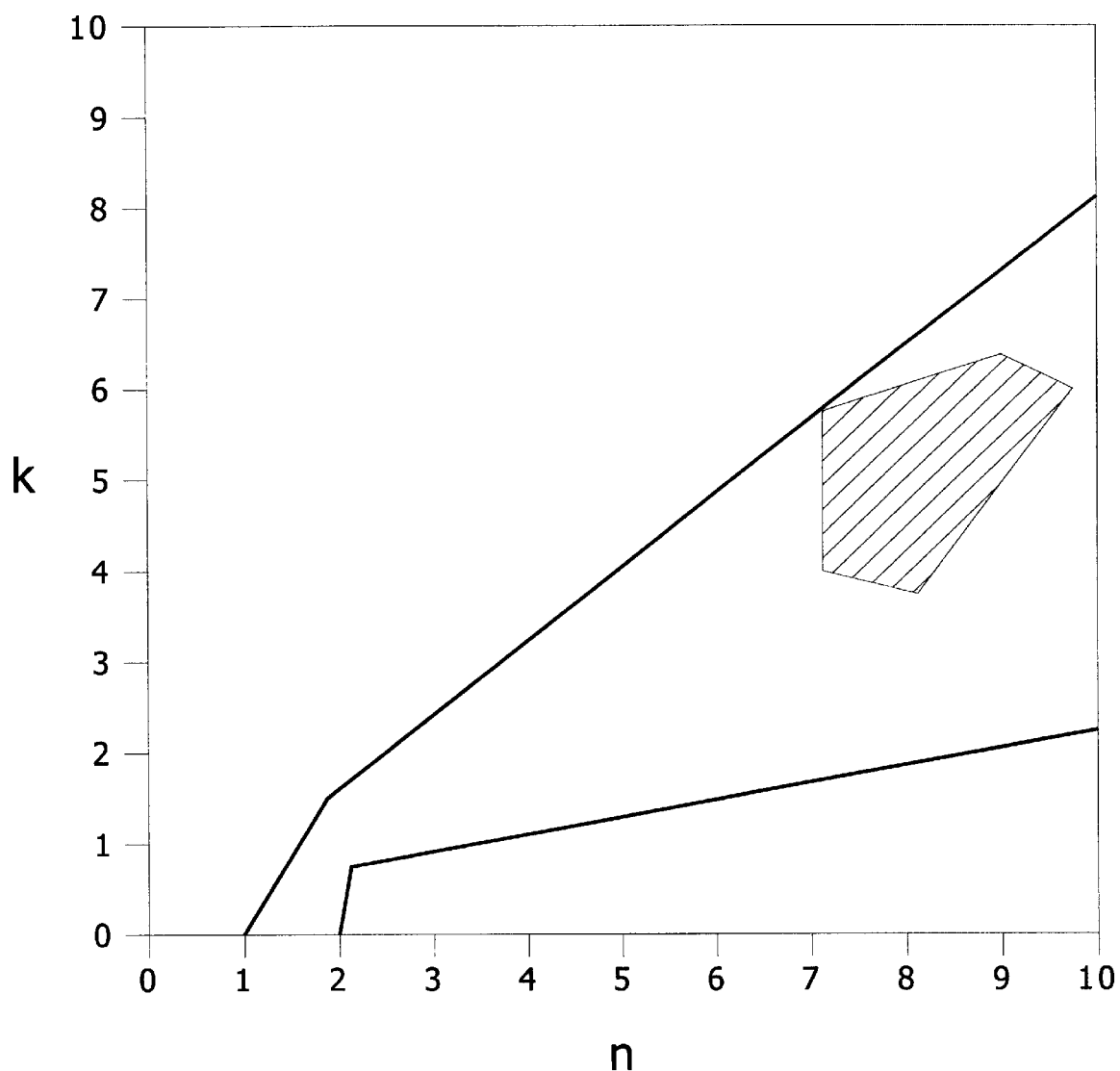
FIG. 3 is a chart for determining combinations of layer thicknesses for a buffer layer and a partial mirror of a Fabry-Perot etalon fulfilling reflectivity and tracking requirements.

By means of a computer program it was calculated whether combinations of layer thicknesses of the buffer layer and partial mirror could be found with partial mirror materials with various complex indices of reflection when the following demands were made on the reflectivity and tracking. The reflectivity in the land in the unwritten state should be higher than 0.65, the reflectivity in the track in the unwritten state should be higher than 0.5 and the tracking contrast, defined as the reflectivity in the track divided by the reflectivity in the land (both in the unwritten state), should be lower than 0.95. It was found that for partial mirror material having a complex index of refraction falling within the pentagon defined by the vertices 7.15+i3.93, 7.15+i5.85, 8.96+i6.28, 9.56+i5.90, and 8.14+i3.77 in the n,k plane, no suitable combination of layer thicknesses could be found fulfilling the reflectivity and tracking requirements. The results of these calculations are given in FIG. 3, wherein for all combinations of n and k the percentage of the total amount of solutions fulfilling the reflectivity and tracking requirements, are given. In the area 1, no solutions could be found. This area falls within the pentagon as defined-above. In the area 2, uptolo% of the solutions were found. In the area 3, 10% up to 80% of the solutions were found. In area 4, more than 80% of the solutions were found. A compact disc was designed according to the solutions given by the computer program.

EXAMPLE 2

Synthesis of non-LC glasses (general method)

A mixture of 1 eq of a compound containing two amine groups (diamine) and 4 eq of a compound containing an oxirane group (epoxide) was heated for 5–20 hours, depending on the diamine used, under a nitrogen atmosphere at a temperature of 130° C. When two or more different diamines or epoxides are used, 40% of weight of chlorobenzene was added for obtaining a homogeneous melt. After 1 hour at 130° C. the chlorobenzene was distilled off. The melt was cooled down and dissolved in tetrahydrofuran, and the solution of approximately 20% (m/M) was precipitated in a 10-fold excess of ethanol. The yields were in the range of 75 to 90%.

EXAMPLE 3

Synthesis of epoxide of cyanobiphenyl (epoxide 1)

A mixture of 39.0 g (0.20 mole) of hydroxycyanobiphenyl, 100 ml (1.25 moles) of epichlorohydrin, and 0.44 g (2.4 mmoles) of benzyl trimethylammoniumchloride was heated to 70° C. Next, a solution of 17 g (0.42 mole) of sodium hydroxide in 100 ml of water was dispensed in 3 hours. Following this addition, there was one extra hour of stirring at 70° C. The reaction mixture was cooled to 20° C., and 200 ml of dichloromethane were added. The organic layer was separated and washed with, successively, sodium chloride solution and water. After drying over magnesium sulfate and concentration by evaporation, the crude product was converted to the crystallized form from 450 ml of methanol. The yield was 38.3 g (76%).

EXAMPLE 4

Synthesis of epoxide of p-biphenyl (epoxide 2)

The epoxide of p-biphenyl (epoxide 2) was prepared in a manner analogous to that for the synthesis of the epoxide of cyanobiphenyl.

EXAMPLE 5

Using 90% epoxide 1 and 10% epoxide of o-biphenyl, ex Janssen, a glass (glass 1) was prepared with 3,3'-sulfonyl dianiline, ex Aldrich, by the general method for the synthesis of non-LC glasses specified above. Tg 99–104° C., MW 1706 (GPC).

EXAMPLE 6

Using epoxide 2, a glass (glass 2) was prepared with 3,3'-sulfonyldianiline, ex Aldrich, by the general method for the synthesis of non-LC glasses specified above. Tg 84–87° C., MW 1232 (GPC).

EXAMPLE 7

A thin aluminum film of 10 nm thickness was deposited on a 1.2 mm thick polycarbonate substrate having a pre-groove with a depth of 170 nm, a width of 0.5 μm, and a track pitch of 1.6 μm. On said thin aluminum layer a layer of glass 1 was spin-coated from a solution in diacetone alcohol (0.9 g in 10 ml). The thickness of the buffer layer was 250 nm. Onto said buffer layer a 100 nm thick aluminum layer was vacuum-deposited. After drying in a vacuum oven at 40° C., a protecting layer of UV curable epoxy-acrylate resin was spin-coated hereonto and cured. The resulting CD was evaluated using an evaluation equipment employing a laser beam of 780 nm. A signal to noise ratio (CNR) of 51 dB was obtained by 1.3 m/sec, 720 kHz and 8 mW recording conditions with 0.7 mW writing power, a reflectivity of 72% was obtained in the land and a reflectivity of about 50% was obtained in the track. The disc appeared to be replayable in a compact disc player.

We claim:

1. An optical recording medium comprising the following layers:

a) a grooved transparent substrate (1), superposed by b) a recording layer comprising a partial mirror (2) of a material having a high complex index of refraction which is not within the pentagon defined by the vertices 7.15 - i3.93, 7.15 - i5.85, 8.96 - i6.28, 9.56 - i5.90, and 8.14 - i3.77 in the n,k plane, superposed by a buffer layer (3) comprising a non-liquid-crystalline high-molecular weight material and optionally a dye, superposed by a thick reflective layer (4), together forming a Fabry-Perot wherein the thickness (d) of the buffer layer within the grooves is set so that the reflection of the medium is in the high reflective state, optionally superposed by c) a protective coating (5).

2. The optical recording medium of claim 1 wherein the reflectance within the groove of the medium is above 20% in the unwritten state.

3. The optical recording medium of claim 1 wherein the reflectance within the groove of the medium is above 50% in the unwritten state and below 40% of the unwritten state in the written state.

4. The optical recording medium of claim 1 wherein the partial mirror (2) is selected from the group consisting of aluminum, nickel, vanadium, chromium, tantalum, and alloys thereof.

5. The optical recording medium of claim 1 wherein the partial mirror (2) is selected from the group consisting of gold, gold alloys, silver, silver alloys, copper, copper alloys, tellurium, tellurium alloys, silicon nitride, silicon, and silicon-germanium.

6. The optical recording medium of claim 1 wherein the substrate is selected from the group consisting of polycarbonate and amorphous polyolefin.

7. A method for the fabrication of the optical recording medium of claim 1, comprising the steps of:

applying a partial mirror onto a grooved substrate, applying a buffer layer onto said partial mirror, and applying a thick reflective layer onto said buffer layer.

8. An apparatus for the continuous fabrication of the optical recording medium of claim 1, comprising:

means for transporting a grooved substrate, means for applying a partial mirror onto said substrate, means for applying a buffer layer onto said partial mirror, and means for applying a thick reflective layer onto said buffer layer.

9. An optical recording medium comprising the following layers:

a) a grooved transparent substrate superposed by b) a recording layer comprising a partial mirror of a material having a high complex index of refraction which is not within the pentagon defined by the vertices 7.15 - i3.93, 7.15 - i5.85, 8.96 - i6.28, 9.56 - i5.90, and 8.14 - i3.77 in the n,k plane, superposed by a buffer layer comprising a non-liquid-crystalline high-molecular weight material and a dye, superposed by a thick reflective layer, together forming a Fabry-Perot wherein the thickness of the buffer layer within the grooves is set so that the reflection of the medium is in the high reflective state, optionally superposed by c) a protective coating.

10. The optical recording medium of claim 9 wherein the buffer layer comprises a dye which absorbs in the wavelength range of 400 to 700 nm.

11. The optical recording medium of claim 9 wherein the buffer layer comprises a dye which absorbs in the wavelength range of 780 to 850 nm.

* * * * *